(12) United States Patent
Warkander

(10) Patent No.: US 6,618,687 B2
(45) Date of Patent: Sep. 9, 2003

(54) TEMPERATURE-BASED ESTIMATION OF REMAINING ABSORPTIVE CAPACITY OF A GAS ABSORBER

(75) Inventor: Dan Warkander, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/985,965

(22) Filed: Oct. 16, 2001

(65) Prior Publication Data

US 2003/0074154 A1 Apr. 17, 2003

(51) Int. Cl.[7] .......................... G01K 17/00; G06F 15/00
(52) U.S. Cl. ........................................ 702/130; 702/99
(58) Field of Search ............................. 702/23, 24, 99, 702/100, 104, 130, 131, 132, 136; 128/202.22, 202.26; 423/213.2, 239.2, 244.02, 243.01

(56) References Cited

U.S. PATENT DOCUMENTS 4,322,224 A * 3/1982 Roth ...................... 423/243.01
4,440,162 A * 4/1984 Sewell et al. ............ 128/202.22
6,274,106 B1 * 8/2001 Held ........................ 423/213.2

* cited by examiner

Primary Examiner—Bryan Bui
(74) Attorney, Agent, or Firm—Donald G. Peck; Harvey A. Gilbert

(57) ABSTRACT

A method and system are provided for estimating remaining absorptive capacity of a gas absorber. Inside the gas absorber, a reaction gas is produced by an exothermic or endothermic reaction. A plurality of temperature sensors include a first temperature sensor positioned at the gas absorber's inlet and subsequent temperature sensors spaced apart along the gas's flow path therethrough. Temperature differences between each subsequent temperature sensor and the first temperature sensor are determined. Each temperature difference is normalized using the largest one of the temperature differences so that corresponding normalized temperature differences are generated. The normalized temperatures differences are indicative of the remaining absorptive capacity of the gas absorber in accordance with a selected, experimentally-determined calibration function.

17 Claims, 1 Drawing Sheet

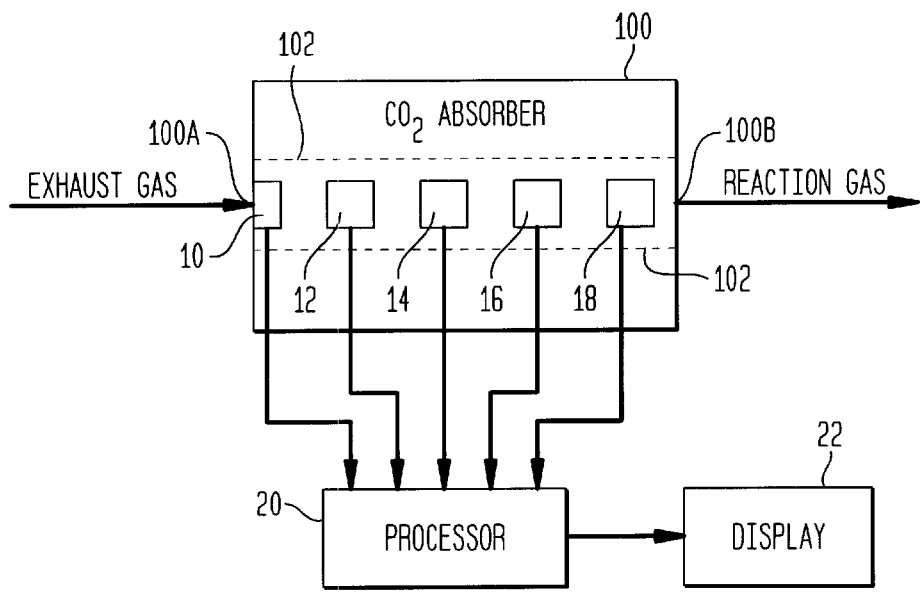
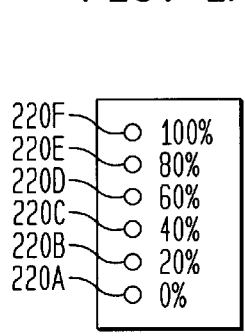
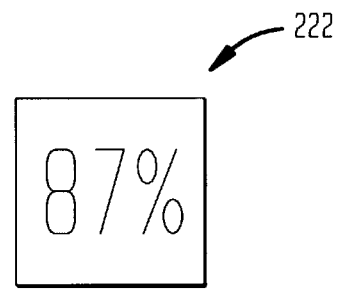
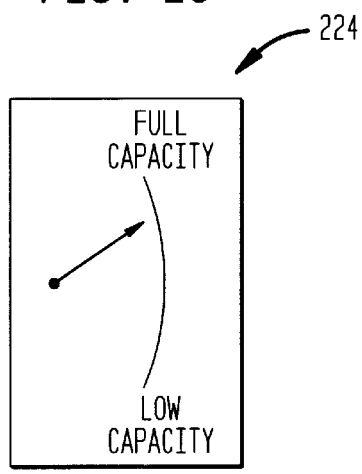

TEMPERATURE-BASED ESTIMATION OF REMAINING ABSORPTIVE CAPACITY OF A GAS ABSORBER

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to gas absorbers, and more particularly to a temperature-based method and system for estimating the remaining absorptive capacity in a gas absorber such as a $CO_2$ absorber used in a re-breathing apparatus.

BACKGROUND OF THE INVENTION

Closed circuit re-breathing systems are used by underwater divers, miners, firefighters, hazardous material handlers, and a variety of other personnel that must work in environmental conditions where breathable air is either unavailable or in short supply. In general, a re-breather includes a carbon dioxide ($CO_2$) absorber or scrubber in its exhaust gas breathing loop. The $CO_2$ absorber includes material that will "absorb" (i.e., react with) the $CO_2$ in the exhaust gas. Since the removal of $CO_2$ is critical, it is important for the user to know when the $CO_2$ absorber is losing its ability to absorb exhaled $CO_2$.

To address this problem, a variety of approaches have been used. For example, U.S. Pat. No. 4,154,586 discloses a method in which the $CO_2$ absorbent material changes color when it is spent. However, in underwater diving and fire fighting applications, the user may not be able to see such a color change. Another approach is described in U.S. Pat. No. 4,146,887 where a temperature difference between the ambient environment and one location inside the absorber is measured and used to provide an "end-of-life" indication. Still another approach is described in U.S. Pat. No. 4,440,162 where temperature is measured at a predetermined location in the absorber. When the temperature exceeds a pre-set value, an alarm is triggered. However, variations in ambient conditions can cause an end-of-life indication or an alarm to come too early or too late in the life of the absorber.

Since the endurance of a $CO_2$ absorber varies with ambient temperature/pressure and with a user's breathing rates, it is desirable to provide a user with ongoing information as to the remaining capacity of the $CO_2$ absorber. However, the above-described prior art approaches are either impractical for certain applications or do not provide such ongoing information.

SUMMARY OF THE INVENTION

Accordingly, it is an object of the present invention to provide a method of estimating the remaining absorptive capacity of a gas absorber.

Another object of the present invention is to provide a method and system of providing a visual display of the remaining absorptive capacity of a gas absorber that absorbs a gas during an exothermic reaction.

Still another object of the present invention is to provide a method of estimating the remaining absorptive capacity of a $CO_2$ absorber.

A still further object of the present invention is to provide a method of estimating the remaining absorptive capacity of a gas absorber of a $CO_2$ absorber in a way that is nearly independent of ambient conditions.

Yet another object of the present invention is to provide a method of visually displaying the approximate remaining absorptive capacity of the $CO_2$ absorber used in a re-breathing system.

Other objects and advantages of the present invention will become more obvious hereinafter in the specification and drawings.

In accordance with the present invention, a method and system are provided for estimating remaining absorptive capacity of a gas absorber that absorbs a gas (e.g., $CO_2$) during an exothermic or endothermic reaction therewith. The gas absorber is disposed in a flow of the gas such that the gas flows into an inlet of the gas absorber and flows therethrough along a flow path. Inside the gas absorber, a reaction gas is produced by the exothermic or endothermic reaction and exits the gas absorber at an outlet thereof. A plurality of temperature sensors are distributed along the flow path. The temperature sensors include a first temperature sensor positioned at the gas absorber's inlet and subsequent temperature sensors spaced apart along the flow path. Temperatures at each temperature sensor are measured and temperature differences between each subsequent temperature sensor and the first temperature sensor are determined. Each temperature difference is normalized using the largest of the temperature differences so that corresponding normalized temperature differences are generated. The normalized temperature differences are indicative of the remaining absorptive capacity of the gas absorber. More specifically, processing includes the selection of a calibration function that is based on an experimentally-determined relationship between the normalized temperature differences and the remaining absorptive capacity. The remaining absorptive capacity can be represented visually on a display as a percentage of an initial absorptive capacity of the gas absorber or as a function of the amount of the gas (that is to be absorbed) that exits the outlet of the gas absorber.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a functional block diagram of a $CO_2$ absorber of a re-breathing system instrumented to carry out the method of estimating the remaining absorptive capacity of the $CO_2$ absorber in accordance with the present invention;

FIG. 2A is a schematic view of an LED display that can be used to visually represent the remaining absorptive capacity;

FIG. 2B is a schematic view of a numeric display that can be used to visually represent the remaining absorptive capacity; and FIG. 2C is a schematic view of an analog, fuel gauge type of display that can be used to visually represent the remaining absorptive capacity.

DETAILED DESCRIPTION OF THE INVENTION

Referring now to the drawings, and more particularly to FIG. 1, a $CO_2$ absorber 100 of a re-breathing system (not shown) is illustrated. As is well known in the art, $CO_2$ absorber 100 receives exhaust gas (i.e., exhaled breath) and exothermically reacts with same along a flow path depicted by dashed lines 102. During its useful life, $CO_2$ absorber 100 outputs a reaction gas that is mostly free of $CO_2$. This reaction gas is then available for use by the re-breathing system. It is to be understood that the particular chemical structure and use of the reaction gas is not a limitation of the present invention.

As mentioned above, an exothermic reaction takes place within $CO_2$ absorber 100 during the effective life thereof. It is to be understood that while the present invention will be described relative to $CO_2$ absorber 100, the present invention can be used in conjunction with any gas absorber that absorbs a gas during an exothermic or endothermic reaction in order to estimate the remaining absorptive capacity of the gas absorber.

In accordance with the present invention, $CO_2$ absorber 100 has a number of temperature sensors (e.g., thermistors or any other temperature sensor) distributed along flow path 102 defined therein. By way of example, five such temperature sensors are shown. However, as will be understood by one of ordinary skill in the art, a greater or lesser number of temperature sensors can be used depending on the geometry of the gas absorber or desired resolution of the remaining absorptive capacity. The temperature sensors are referenced by numerals 10, 12, 14, 16 and 18 where sensor 10 is positioned to sense the temperature of the gas in an inlet 100A of $CO_2$ absorber 100. Temperature sensors 12–18 are distributed in a spaced-apart fashion along flow path 102. Although not a requirement of the present invention, the last of the temperature sensors along flow path 102 (i.e., sensor 18) is typically positioned at or near the outlet 100B of $CO_2$ absorber 100.

Temperature sensors 10–18 have their outputs coupled to a processor 20 where the corresponding measured temperatures $T_{10}$–$T_{18}$ are processed to continually provide an estimate of the remaining absorptive capacity of $CO_2$ absorber 100. The estimate can be displayed visually by means of a display 22 coupled to processor 20. As illustrated by FIGS. 2A–2C, display 22 can be implemented in a variety of ways without departing from the scope of the present invention. For example, display 220 in FIG. 2A is a series of lights (e.g., LEDs) 220A–220F with each light corresponding to a remaining capacity of $CO_2$ absorber 100. Typically, remaining capacity is depicted as a percentage of the absorber's initial capacity. Display 220 could be operated to display all lights up to the current percentage of remaining capacity to provide the user with a quick and ongoing indication of the remaining capacity. Another display option is illustrated in FIG. 2B where a numeric display 222 is used to provide a numeric indication of the current percentage of remaining capacity. Still another display option is illustrated in FIG. 2C where an analog fuel type gauge 224 is used to visually represent the percentage of remaining capacity in the same way an automobile's fuel gauge does.

The present invention could alternatively make use of a display that depicted the amount of $CO_2$ exiting outlet 100B. That is, over its life, $CO_2$ absorber 100 will become less effective at absorbing the $CO_2$ in the exhaust gas. Accordingly, processor 20 could be configured/calibrated to output a display signal that causes display 22 to depict the remaining absorptive capacity as a function of the amount of $CO_2$ exiting $CO_2$ absorber 100 at outlet 100B. Then, in the case of a numeric display, for example, an estimate of the amount of $CO_2$ exiting the absorber could be displayed with the user knowing acceptable versus unacceptable amounts of $CO_2$.

Regardless of the choice for visual representation of the remaining absorptive capacity, the present invention first processes the measured temperatures in the same fashion. Specifically, at any given time during the use of $CO_2$ absorber 100, temperature measurements from sensors 10–18 are provided to processor 20. At start up, with fresh absorbent in $CO_2$ absorber 100, the exothermic reaction (reaction front) takes place close to inlet 100A of the absorber 100 which produces a high temperature in that region. As the warm gas travels downstream, it heats up the rest of the absorber. As the absorbent gets used up, its exothermic reaction activity drops and the temperature in that area drops.

Using the measured temperatures, a set of temperature differences are generated where each temperature difference is defined as the temperature difference between the temperature at inlet 100A (as measured by sensor 10) and one of the subsequent sensors (i.e., sensors 12–18) distributed along flow path 102. That is, in the illustrated example, the temperature differences can be written as follows:

$$\Delta T_1 = T_{12} - T_{10}$$

$$\Delta T_2 = T_{14} - T_{10}$$

$$\Delta T_3 = T_{16} - T_{10}$$

$$\Delta T_4 = T_{18} - T_{10}$$

The next step in the process is to normalize this set of temperature differences using the difference that is greatest ($\Delta T_{max}$) for that particular set of temperature measurements. For example, shortly after start-up, the greatest temperature difference will presumably be $\Delta T_{max} = \Delta T_1$ since the exothermic reaction of $CO_2$ will occur near inlet 100A. The corresponding relative or normalized temperature differences are generated as follows:

$$\Delta T_1 / \Delta T_{max}$$

$$\Delta T_2 / \Delta T_{max}$$

$$\Delta T_3 / \Delta T_{max}$$

$$\Delta T_4 / \Delta T_{max}$$

The normalized temperature differences are then compared to a predetermined experimentally-based calibration curve or function to determine the remaining absorptive capacity of $CO_2$ absorber 100. The calibration curve or function could be represented by a plot, for example, of the percentage of remaining absorptive capacity (or the amount of $CO_2$ exiting the absorber) versus relative or normalized temperatures. The predetermined calibration curve or function can be developed by actually testing the particular gas absorber design. That is, in the test or calibration determination mode, the gas absorber would be used continuously until there was zero absorptive capacity. During the test process, temperatures would be recorded at the various sensor positions at predetermined time intervals to yield a temperature distribution. A calibration function can then be derived from this distribution as would be well understood by one of ordinary skill in the art.

In tests of the present invention, experimental data confirmed the belief that temperature increases in $CO_2$ absorber 100 vary in complex ways depending on ambient pressure, ambient temperature, and the amount of $CO_2$ in the exhaust gas. However, by using the relative temperatures, the apparent complexity was drastically reduced. Some further refinements may be gained by measuring the current ambient pressure and/or temperature. Further, it may be necessary to combine a number of experimentally determined calibration curves/functions from varying ambient pressures and temperature to yield some average function which, in the average usage, will provide the user with a "safe" indication of remaining absorptive capacity. However, in some extreme environments, the average function may overestimate remaining capacity when little or none remains. Thus, in these applications, it may be desirable to use calibration curves/functions that provide for the "safest" level of operation, i.e., meaning that an average usage would still have plenty of remaining absorptive capacity even when the display indicated zero capacity.

The advantages of the present invention are numerous. The method and system can be used to provide an ongoing indication of the remaining absorptive capacity of a gas absorber that produces an exothermic or endothermic reaction. Thus, the user is not forced to react to a last-minute, end-of-life alarm. This is especially important when the present invention is applied to $CO_2$ absorbers used in re-breathing systems. Since only relative temperatures are used, the approach of the present invention is nearly independent of ambient conditions. Further, the present invention can be adapted to a variety of exothermic or endothermic reaction type gas absorbers. Still further, a variety of operating environments can be accommodated merely by providing the relevant calibration curves/functions. Another advantage is that the processor and display do not have to be operating continuously to record all events from the start, but can be turned on only when desired thereby saving power.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of estimating remaining absorptive capacity of a gas absorber that absorbs a gas during an exothermic or endothermic reaction therewith, said method comprising the steps of:

disposing said gas absorber in a flow of said gas, wherein said gas flows into said gas absorber at an inlet thereof and flows through said gas absorber along a flow path, and wherein a reaction gas is produced by said reaction, said reaction gas exiting said gas absorber at an outlet thereof;

distributing a plurality of temperature sensors along said flow path wherein said plurality of temperature sensors includes a first temperature sensor positioned at said inlet and subsequent temperature sensors spaced apart along said flow path;

measuring a temperature at each of said plurality of temperature sensors;

determining temperature differences between each of said subsequent temperature sensors and said first temperature sensor;

normalizing each of said temperature differences to a largest one of said temperature differences wherein corresponding normalized temperature differences are generated; and comparing said normalized temperature differences with an experimentally-determined calibration function to determine the remaining absorptive capacity of said gas absorber.

2. A method according to claim 1 wherein said step of distributing includes the step of positioning one of said subsequent temperature sensors at said outlet.

3. A method according to claim 1 further comprising the step of displaying a visual representation of the remaining absorptive capacity wherein said visual representation depicts the remaining absorptive capacity as a percentage of an initial absorptive capacity of said gas absorber.

4. A method according to claim 1 further comprising the step of displaying a visual representation of the remaining absorptive capacity wherein said visual representation depicts the remaining absorptive capacity as a function of the amount of said gas exiting said outlet.

5. A method according to claim 1 further comprising the step of comparing said normalized temperature differences with an experimentally-determined calibration function to determine the remaining absorptive capacity.

6. A method according to claim 1 further comprising the step of displaying a visual representation of the remaining absorptive capacity wherein said visual representation depicts the remaining absorptive capacity as a function of the amount of $CO_2$ gas escaping said $CO_2$ absorber.

7. A method of estimating remaining absorptive capacity of a $CO_2$ absorber in a re-breather system, said method comprising the steps of:

passing exhaled $CO_2$ gas from said re-breather system through said $CO_2$ absorber;

distributing a plurality of temperature sensors throughout said $CO_2$ absorber wherein said plurality of temperature sensors includes a first temperature sensor positioned where said exhaled $CO_2$ enters said $CO_2$ absorber and subsequent temperature sensors spaced apart in said $CO_2$ absorber;

measuring a temperature at each of said plurality of temperature sensors;

determining temperature differences between each of said subsequent temperature sensors and said first temperature sensor;

normalizing each of said temperature differences to a largest one of said temperature differences wherein corresponding normalized temperature differences are generated; and comparing said normalized temperature differences with an experimentally-determined calibration function to determine the remaining absorptive capacity of said $CO_2$ absorber.

8. A method according to claim 7 wherein said step of distributing includes the step of positioning one of said subsequent temperature sensors at an outlet of said $CO_2$ absorber.

9. A method according to claim 7 further comprising the step of displaying a visual representation of the remaining absorptive capacity wherein said visual representation depicts the remaining absorptive capacity as a percentage of an initial absorptive capacity of said $CO_2$ absorber.

10. A method according to claim 7 further comprising the step of comparing said normalized temperature differences with an experimentally-determined calibration function to determine the remaining absorptive capacity.

11. A system for estimating remaining absorptive capacity of a gas absorber that absorbs a gas during an exothermic or endothermic reaction therewith, said gas absorber having an inlet receiving a flow of said gas and defining a flow path therethrough along which said gas flows, wherein a reaction gas is produced by said reaction, said reaction gas exiting said gas absorber at an outlet thereof, said system comprising:

a plurality of temperature sensors distributed along said flow path wherein said plurality of temperature sensors includes a first temperature sensor positioned at said inlet and subsequent temperature sensors spaced apart along said flow path, wherein each of said plurality of temperature sensors can measure a temperature;

means for determining temperature differences between each of said subsequent temperature sensors and said first temperature sensor;

means for normalizing each of said temperature differences to a largest one of said temperature differences wherein corresponding normalized temperature differences are generated;

means for comparing said normalized temperature differences with an experimentally-determined calibration function to determine the remaining absorptive capacity of said gas absorber; and means for displaying a visual representation of the remaining absorptive capacity.

12. A system as in claim 11 wherein said visual representation depicts the remaining absorptive capacity as a percentage of an initial absorptive capacity of said gas absorber, and wherein said means for displaying comprises a numeric display indicating said percentage.

13. A system as in claim 11 wherein said visual representation depicts the remaining absorptive capacity as a percentage of an initial absorptive capacity of said gas absorber, and wherein said means for displaying comprises a plurality of lights illuminated in accordance with said percentage.

14. A system as in claim 11 wherein said visual representation depicts the remaining absorptive capacity as a percentage of an initial absorptive capacity of said gas absorber, and wherein said means for displaying comprises an analog gauge for indicating said percentage.

15. A system as in claim 11 wherein said visual representation depicts the remaining absorptive capacity as a function of the amount of said gas exiting said outlet, and wherein said means for displaying comprises a numeric display indicating the amount of said gas exiting said outlet.

16. A system as in claim 11 wherein said visual representation depicts the remaining absorptive capacity as a function of the amount of said gas exiting said outlet, and wherein said means for displaying comprises a plurality of lights illuminated in accordance with the amount of said gas exiting said outlet.

17. A system as in claim 11 wherein said visual representation depicts the remaining absorptive capacity as a function of the amount of said gas exiting said outlet, and wherein said means for displaying comprises an analog gauge for indicating the amount of said gas exiting said outlet.

* * * * *